No. 662,084. Patented Nov. 20, 1900.
J. McGOUGH.
MOWING OR GRAIN CUTTING MACHINE.
(Application filed Jan. 27, 1900.)
(No Model.) 2 Sheets—Sheet 2.
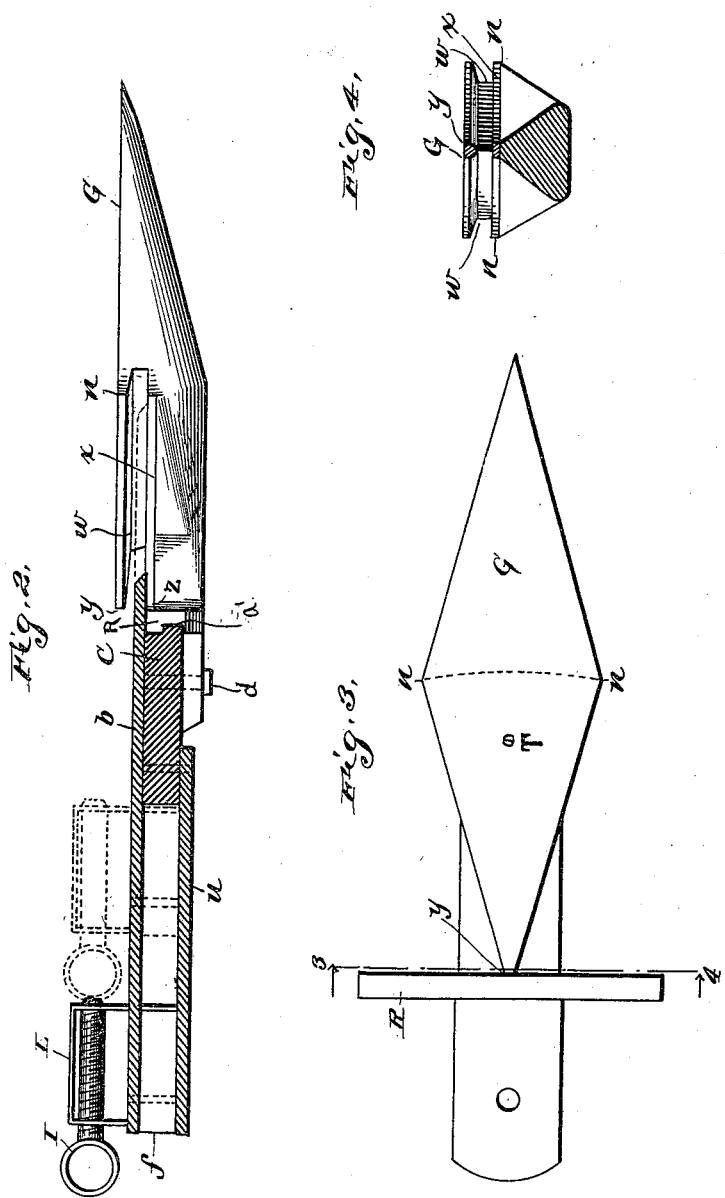

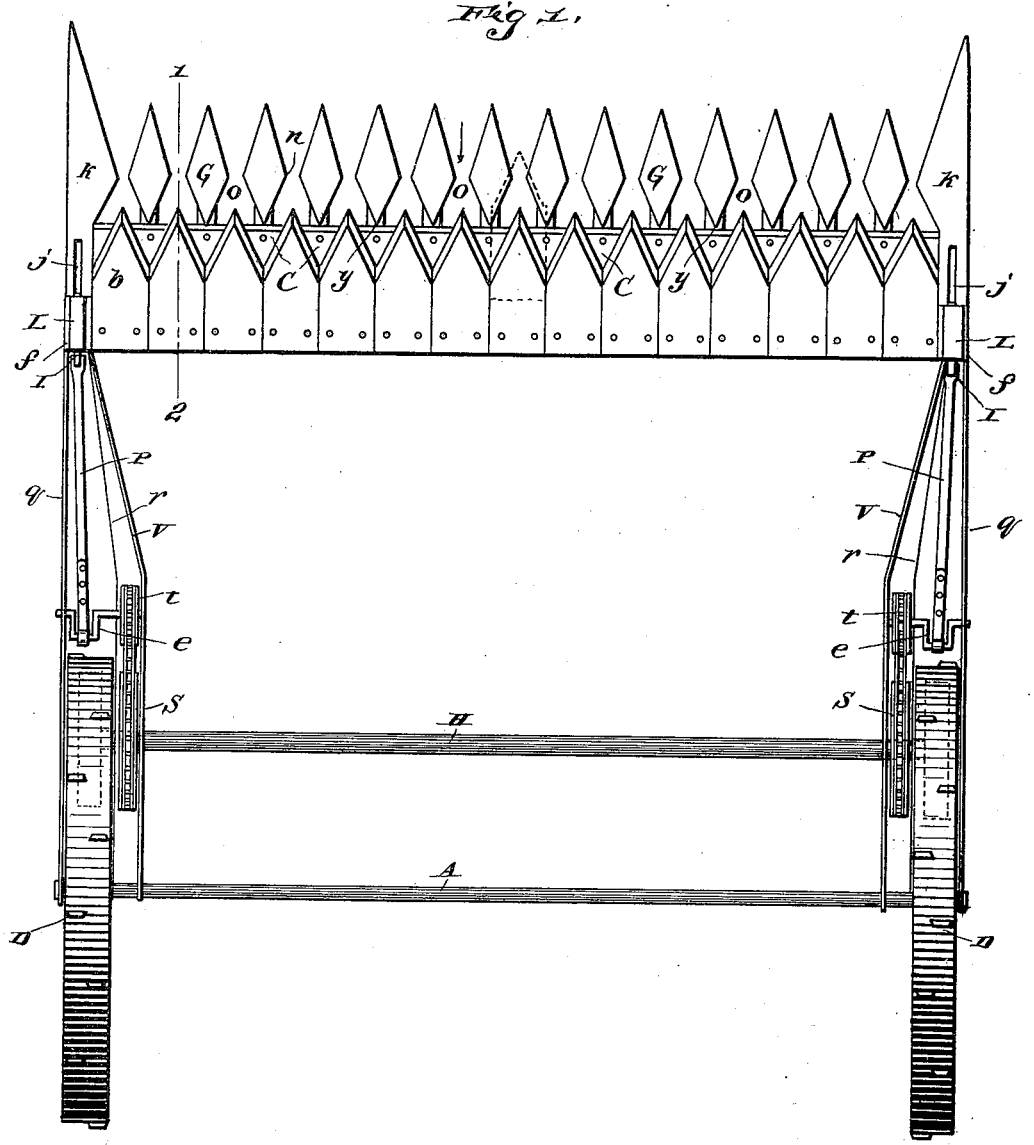

UNITED STATES PATENT OFFICE.

JOHN McGOUGH, OF PIERRE, SOUTH DAKOTA.

MOWING OR GRAIN-CUTTING MACHINE.

SPECIFICATION forming part of Letters Patent No. 662,084, dated November 20, 1900.

Application filed January 27, 1900. Serial No. 2,993. (No model.)

*To all whom it may concern:*

Be it known that I, JOHN MCGOUGH, a citizen of the United States, residing at Pierre, in the county of Hughes and State of South Dakota, have invented certain new and useful Improvements in Mowing or Grain-Cutting Machines, of which the following is a specification.

My invention relates to improvements in the cutting mechanism of mowing-machines or grain-reapers in which pointed sickle-blades move directly forward against the standing grass or grain and work in conjunction with guards attached to a finger-bar; and the objects of my improvement are, first, to provide cutting mechanism adapted to cutting grass, grain, &c., in the field that will require little power to operate and will not clog in thick grass, and, second, to afford facilities for the proper adjustment of the sickle. I attain these objects by the mechanism illustrated in the accompanying drawings, in which—

Figure 1 is a top plan view of part of a machine, showing how the sickle may be operated without the use of bevel-gear; Fig. 2, a vertical section of part of the machine on the line 1 2, Fig. 1; Fig. 3, a top plan view of part of a guard as it appears removed from the machine. Fig. 4, a vertical section of a guard on line 3 4, Fig. 3.

Similar letters refer to similar parts throughout the several views.

The axle A and finger-bar C, connected by the sides q q and framework r r v v, constitute the framework of the machine. The axle A is supported by drive-wheels D D.

H is a shaft supported by v v and is turned by means of a pinion on each end fitting into teeth on an inner rim of the drive-wheels D D.

s s are sprocket-wheels attached to the shaft H.

t t are sprocket-wheels attached to the cranks e e, which are supported by q r q r.

As the machine is propelled forward by the ordinary means the drive-wheels D D turn the sprocket-wheels s s and t t by means of a link belt passing over and around them.

P P are pitman-rods attached to the cranks e e at one end and with I I at the other.

L L are lugs at or near the ends of the sickle-bar f and attached to it. The lugs L L move in slots l l in the shoes k k when moved by the pitman-rods P P, thus moving the sickle forward and backward. The sickle comprises a sickle-bar, with sections or blades b b attached in the ordinary way.

I I are screw-bolts passing through the lugs L L, and to these screw-bolts the pitman-rods P P may be connected by means of a flexible joint. By turning the screw-bolts I I the position of the sickle may be regulated, so that when the sickle-blades become shorter by wear they may be moved closer to the guard by thus lengthening the reach of the pitman-rods.

The manner of cutting is thus: As the machine is drawn forward the pointed guards G G enter the standing grass or grain, and it slides through a narrow opening between the guards in the direction of the arrow and fills the space O, which gradually becomes wider toword the cutter-bar C. Then the sickle, with blades which converge to a point forward, about angling, corresponding to the sides of the space O from the point n toward the cutter-bar and with their converging edges sharp, move forward, and their points divide the standing grass, &c., in the space O, leaving about half on each side and presses it against the guards. Then as the sharp lower edges of the sickle-blades enter the grooves w w in the sides of the guards they move close to a ledger-plate x, and thus cutting the grass, &c., they draw back, allowing the space O to fill again.

To more fully describe a guard: From the forward point, which is sharp to the points n n, a little rearward of the center, the guard gradually becomes wider and converges on its upper surface and at the ledger-plate x from n n to Y. The ledger-plate x extends from side to side of the guard below grooves w w along its sides, and its outer sides have cutting edges from n n to Y, while its upper surface is on a level with that of the finger-bar C, and it is held in position by having its forward end convexed to fit into a concave space in the interior of the guard and having a screw T through it from the top of the guard a little forward of its center. At the point Y the guard is wider on its under side than at the ledger-plate x immediately above. Such width it retains on its under side directly forward on a line at right angles to the finger-bar, while the upper surface on which the ledger-plate rests corresponds in width to the lower edges of said ledger-plate. At the rear end of the guard G is a rectangular cross-arm R, which helps to keep the guard in position, the upper surface of which is on a level with that of the finger-bar C and ledger-plate x when the guard is in position. In the side next the rear of the cross-arm R is a groove z, into which a rectangular projection a' of the lower front side of the finger-bar C enters. By this means part of the strain of keeping the guard in position is removed from the bolt d, which attaches the guard G to the finger-bar C by passing through the part of the guard which extends back from the cross-arm R and under the finger-bar as in ordinary mowers.

U is a shield or shoe passing under the finger-bar C from the guards back and under the sickle-bar.

Having described my invention, I do not claim the frame or general plan of a machine which I described as an invention. I only wished to show by it the manner of operating the mechanism used in cutting; but What I do claim as my invention, and desire to secure by Letters Patent, is—

1. The combination, in a mowing or grain-cutting machine, of a sickle having blades with sharp forwardly-conveying edges, and means for imparting a forward-and-backward motion to the sickle which cuts grass, grain, &c., on a forward stroke, in combination with guards attached to a finger-bar which have grooves in their sides to receive the sharp edges of the sickle-blades, substantially as described.

2. The combination, in a mowing or grain-cutting machine, of guards attached to a finger-bar having their forward ends pointed and gradually growing wider to points n n a little rearward of the center, and from the points n n converging toward Y and having grooves w w in their sides ledger-plates x and cross-arms R in combination with the sickle having blades with the forwardly-converging edges substantially as set forth.

3. The combination, in a mowing or grain-cutting machine with the pointed guards and the sickle with blades having forwardly-converging edges said sickle having a forward-and-backward motion as described, of lugs attached to the sickle having screw-bolts passing therethrough to adjust the position of the sickle with respect to the guards, and with pitman-rods P, P, connected with screw-bolts by means of flexible joints, and through which the forward-and-backward motion is imparted to the sickle all substantially as set forth.

JOHN McGOUGH.

Witnesses:
JOHN F. HUGHES,
D. W. MARCH.